United States Patent
Yang et al.

(10) Patent No.: US 12,489,568 B2
(45) Date of Patent: Dec. 2, 2025

(54) METHOD AND DEVICE FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 514 days.

(21) Appl. No.: 18/040,564

(22) PCT Filed: Aug. 6, 2021

(86) PCT No.: PCT/KR2021/010430
§ 371 (c)(1),
(2) Date: Feb. 3, 2023

(87) PCT Pub. No.: WO2022/031118
PCT Pub. Date: Feb. 10, 2022

(65) Prior Publication Data
US 2023/0327824 A1  Oct. 12, 2023

Related U.S. Application Data

(60) Provisional application No. 63/062,391, filed on Aug. 6, 2020.

(51) Int. Cl.
*H04L 1/1867* (2023.01)
*H04L 1/1812* (2023.01)

(52) U.S. Cl.
CPC .......... *H04L 1/1896* (2013.01); *H04L 1/1812* (2013.01)

(58) Field of Classification Search
CPC ... H04L 1/1896; H04L 1/1812; H04L 1/1822; H04L 1/1861; H04L 1/1854; H04L 5/00;
(Continued)

(56) References Cited

FOREIGN PATENT DOCUMENTS

| KR | 10-2015-0037762 | 4/2015 |
| WO | WO 2019/216816 | 11/2019 |

(Continued)

OTHER PUBLICATIONS

Machine translated to English version of WO 2020/111686 A1 retrieved from PE2E (Year: 2020).*

(Continued)

*Primary Examiner* — Charles C Jiang
*Assistant Examiner* — Rachel Elizabeth Marks
(74) *Attorney, Agent, or Firm* — Fish & Richardson P.C.

(57) ABSTRACT

The present disclosure relates to a wireless communication system, and specifically to a method and a device therefor, the method comprising: a step for receiving configuration information about a plurality of cells comprising (i) a first cell having a first HARQ process index and operable with a first priority, and (ii) a second cell having only a second HARQ process index and operating only with a second priority lower than the first priority; a step for receiving an HARQ-ACK feedback request via DCI; and a step for transmitting an HARQ-ACK codebook for the plurality of cells on the basis of the HARQ-ACK feedback request, wherein HARQ-ACK information in the HARQ-ACK codebook is in descending order of first cell index and then HARQ process index, and the HARQ-ACK information about the second cell is excluded from the HARQ-ACK codebook on the basis that the first priority is indicated by the DCI.

11 Claims, 15 Drawing Sheets

(58) Field of Classification Search
CPC ... H04W 72/04; H04W 72/12; H04W 72/232; H04W 72/1273
See application file for complete search history.

(56) References Cited

FOREIGN PATENT DOCUMENTS

| WO | WO-2019216816 A2 | * | 11/2019 | ............ H04W 72/23 |
|----|------------------|---|---------|-------------------------|
| WO | WO 2020/032779   |   | 2/2020  |                         |
| WO | WO 2020/111686   |   | 6/2020  |                         |
| WO | WO-2020111686 A1 | * | 6/2020  | ............... H04L 1/00 |

OTHER PUBLICATIONS

International Search Report and Written Opinion in International Appln. No. PCT/KR2021/010430, mailed on Dec. 10, 2021, 9 pages (with English translation).
LG Electronics, "Remaining issues of HARQ procedure for NR-U," 3GPP TSG RAN WG1 #100, R1-2000665, e-Meeting, Feb. 24-Mar. 6, 2020, 10 pages.

* cited by examiner

FIG. 12

| Cell configuration | | | | | | | | | | |
|---|---|---|---|---|---|---|---|---|---|---|
| Cell | Cell #1 (All LP) | | | Cell #2 (All HP) | | | Cell #3 (8 LP + 8 HP) | | | |
| HARQ process | Hp#0 | ... | Hp#15 | Hp#0 | ... | Hp#15 | Hp#0 | ... | Hp#7 | Hp#8 | ... | Hp#15 |
| Priority | LP | ... | LP | HP | ... | HP | HP | ... | HP | LP | ... | LP |

FIG. 13

| HARQ-ACK codebook (Type 3) - Opt1 | | | | | | | | | | | | |
|---|---|---|---|---|---|---|---|---|---|---|---|---|
| Cell #1 (All LP) | | | Cell #2 (All HP) | | | | Cell #3 (8 LP + 8 HP) | | | | | |
| Order | Hp#0 | ... | Hp#15 | Hp#0 | ... | Hp#15 | Hp#0 | Hp#7 | ... | Hp#8 | Hp#15 |
| Priority | LP | ... | LP | HP | ... | HP | HP | HP | ... | LP | LP |
| A/N bits | X | ... | X | A/N | ... | A/N | A/N | A/N | ... | A/N | A/N |

MSB ← → LSB

FIG. 14

| HARQ-ACK codebook (Type 3) - Opt2 | | | | Cell #2 (All HP) | | | Cell #3 (8 LP + 8 HP) | | | |
|---|---|---|---|---|---|---|---|---|---|---|
| Cell #1 (All LP) | | | | | | | | | | |
| Hp#0 | ... | Hp#15 | Hp#0 | ... | Hp#15 | Hp#0 | ... | Hp#7 | Hp#8 | ... | Hp#15 |
| LP | ... | LP | HP | ... | HP | HP | ... | HP | LP | ... | LP |
| X | ... | X | A/N | ... | A/N | A/N | ... | A/N | X | ... | X |

Order / Priority / A/N bits

MSB ... LSB

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/010430, filed on Aug. 6, 2021, which claims the benefit of U.S. Provisional Application No. 63/062,391, filed on Aug. 6, 2020. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, a method of transmitting control information in a wireless communication system includes receiving configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present, receiving a HARQ Acknowledgement (HARQ-ACK) feedback request through Downlink Control Information (DCI), and transmitting a HARQ-ACK codebook for the plurality of cells based on the HARQ-ACK feedback request, HARQ-ACK information in the HARQ-ACK codebook being configured in an order of a cell index first and a HARQ process index, wherein based on the first priority being indicated by the DCI, HARQ-ACK information for the second cell is excluded from the HARQ-ACK codebook.

According to a second aspect of the present disclosure, a user equipment (UE) used in a wireless communication includes at least one radio frequency (RF) unit, at least one processor, and at least one computer memory operatively connected to the at least one processor and configured to cause the at least one processor to perform an operation when being executed, the operation including receiving configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present, receiving a HARQ Acknowledgement (HARQ-ACK) feedback request through Downlink Control Information (DCI), and transmitting a HARQ-ACK codebook for the plurality of cells based on the HARQ-ACK feedback request, HARQ-ACK information in the HARQ-ACK codebook being configured in an order of a cell index first and a HARQ process index,
wherein based on the first priority being indicated by the DCI, HARQ-ACK information for the second cell is excluded from the HARQ-ACK codebook.

According to a third aspect of the present disclosure, a device for a user equipment (UE) includes at least one processor, and at least one computer memory operatively connected to the at least one processor and configured to cause the at least one processor to perform an operation when being executed, the operation including receiving configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present, receiving a HARQ Acknowledgement (HARQ-ACK) feedback request through Downlink Control Information (DCI), and transmitting a HARQ-ACK codebook for the plurality of cells based on the HARQ-ACK feedback request, HARQ-ACK information in the HARQ-ACK codebook being configured in an order of a cell index first and a HARQ process index, wherein based on the first priority being indicated by the DCI, HARQ-ACK information for the second cell is excluded from the HARQ-ACK codebook.

According to a fourth aspect of the present disclosure, a computer readable storage includes at least one computer program for causing at least one processor to perform an operation when being executed, the operation including receiving configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present, receiving a HARQ Acknowledgement (HARQ-ACK) feedback request through Downlink Control Information (DCI), and transmitting a HARQ-ACK codebook for the plurality of cells based on the HARQ-ACK feedback request, HARQ-ACK information in the HARQ-ACK codebook being configured in an order of a cell index first and a HARQ process index, wherein based on the first priority being indicated by the DCI, HARQ-ACK information for the second cell is excluded from the HARQ-ACK codebook.

According to a fifth aspect of the present disclosure, a method of receiving control information by a base station (BS) in a wireless communication system includes transmitting configuration information of a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present, transmitting a HARQ Acknowledgement (HARQ-ACK) feedback request through Downlink Control Information (DCI), and receiving a HARQ-ACK codebook for the plurality of cells based on the HARQ-ACK feedback request, HARQ-ACK information in the HARQ-ACK codebook being configured in an order of a cell index first and a HARQ process index, wherein based on the first priority being indicated by the DCI, HARQ-ACK information for the second cell is excluded from the HARQ-ACK codebook.

According to a sixth aspect of the present disclosure, a base station (BS) used in a wireless communication system includes at least one radio frequency (RF) unit, at least one processor, and at least one computer memory operatively connected to the at least one processor and configured to cause the at least one processor to perform an operation when being executed, the operation including transmitting configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present, transmitting a HARQ Acknowledgement (HARQ-ACK) feedback request through Downlink Control Information (DCI), and receiving a HARQ-ACK codebook for the plurality of cells based on the HARQ-ACK feedback request, HARQ-ACK information in the HARQ-ACK codebook being configured in an order of a cell index first and a HARQ process index, wherein based on the first priority being indicated by the DCI, HARQ-ACK information for the second cell is excluded from the HARQ-ACK codebook.

Based on the second priority being indicated by the DCI, the HARQ-ACK codebook may include both HARQ-ACK information for the first cell and the second cell.

The first cell may include both the first HARQ process index and the second HARQ process index, and based on the first priority being indicated by the DCI, the HARQ-ACK codebook may include only HARQ-ACK information on the first HARQ process index for the first cell.

The first cell may include both the first HARQ process index and the second HARQ process index, and based on the first priority being indicated by the DCI, the HARQ-ACK codebook may include both HARQ-ACK information for the first HARQ process index and the second HARQ process index for the first cell.

The first and second priorities may be related to a priority of Physical Downlink Shared Channel (PDSCH) transmission or corresponding HARQ-ACK feedback transmission related to a HARQ process index.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 11 to 15 show an example of an ACK/NACK transmission procedure according to the present disclosure.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
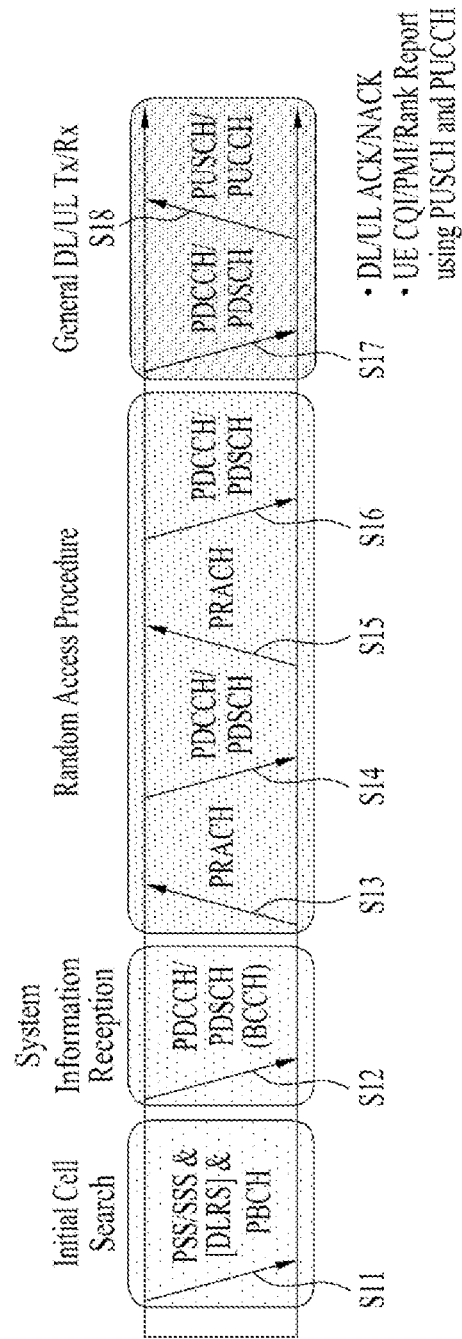
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
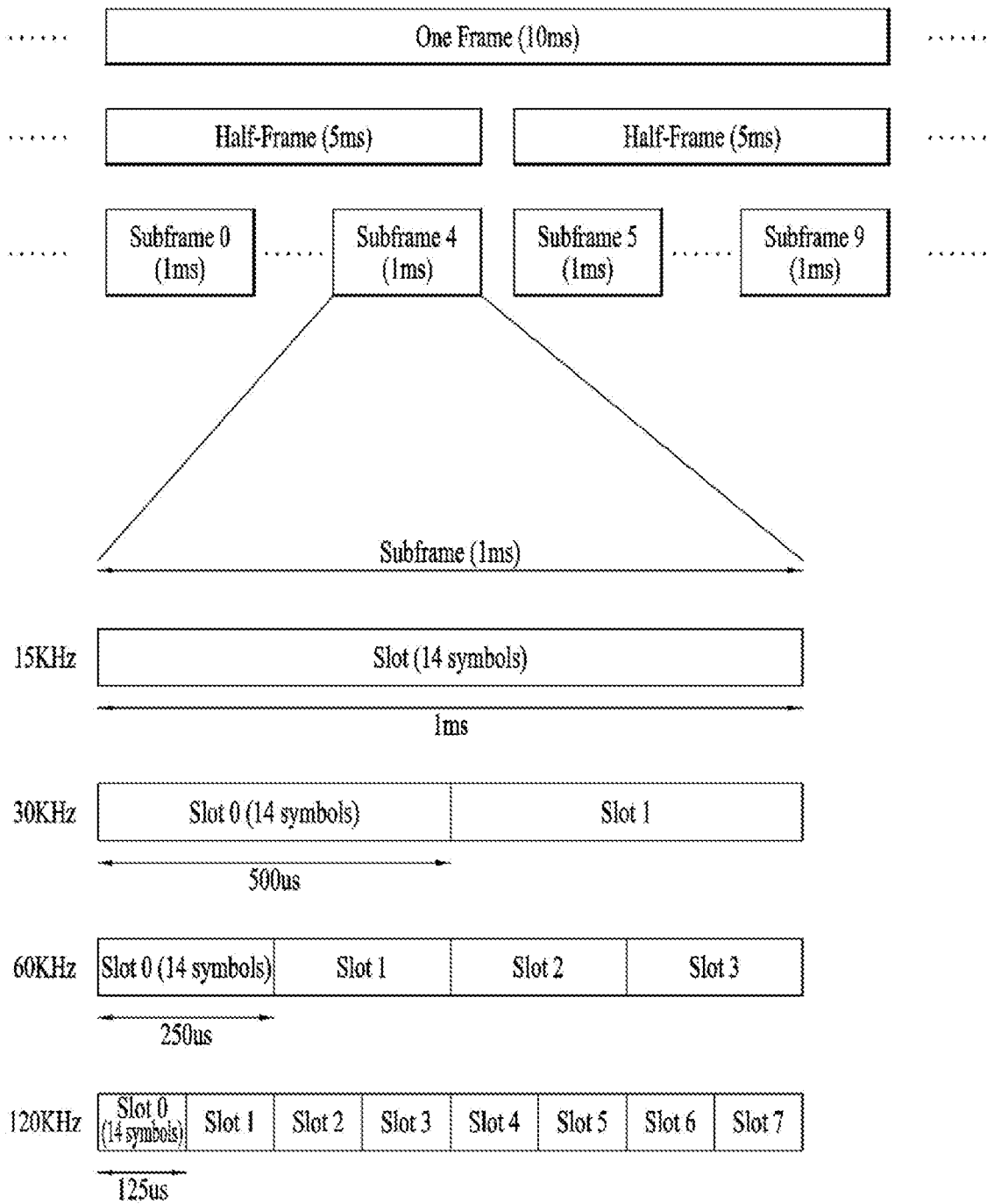
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N_{symb}^{slot}$ | $N_{slot}^{frame,u}$ | $N_{slot}^{subframe,u}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

$N_{symb}^{slot}$: Number of symbols in a slot
$N_{slot}^{frame,u}$: Number of slots in a frame
$N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N_{symb}^{slot}$ | $N_{slot}^{frame,u}$ | $N_{slot}^{subframe,u}$ |
|---|---|---|---|
| 60 kHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
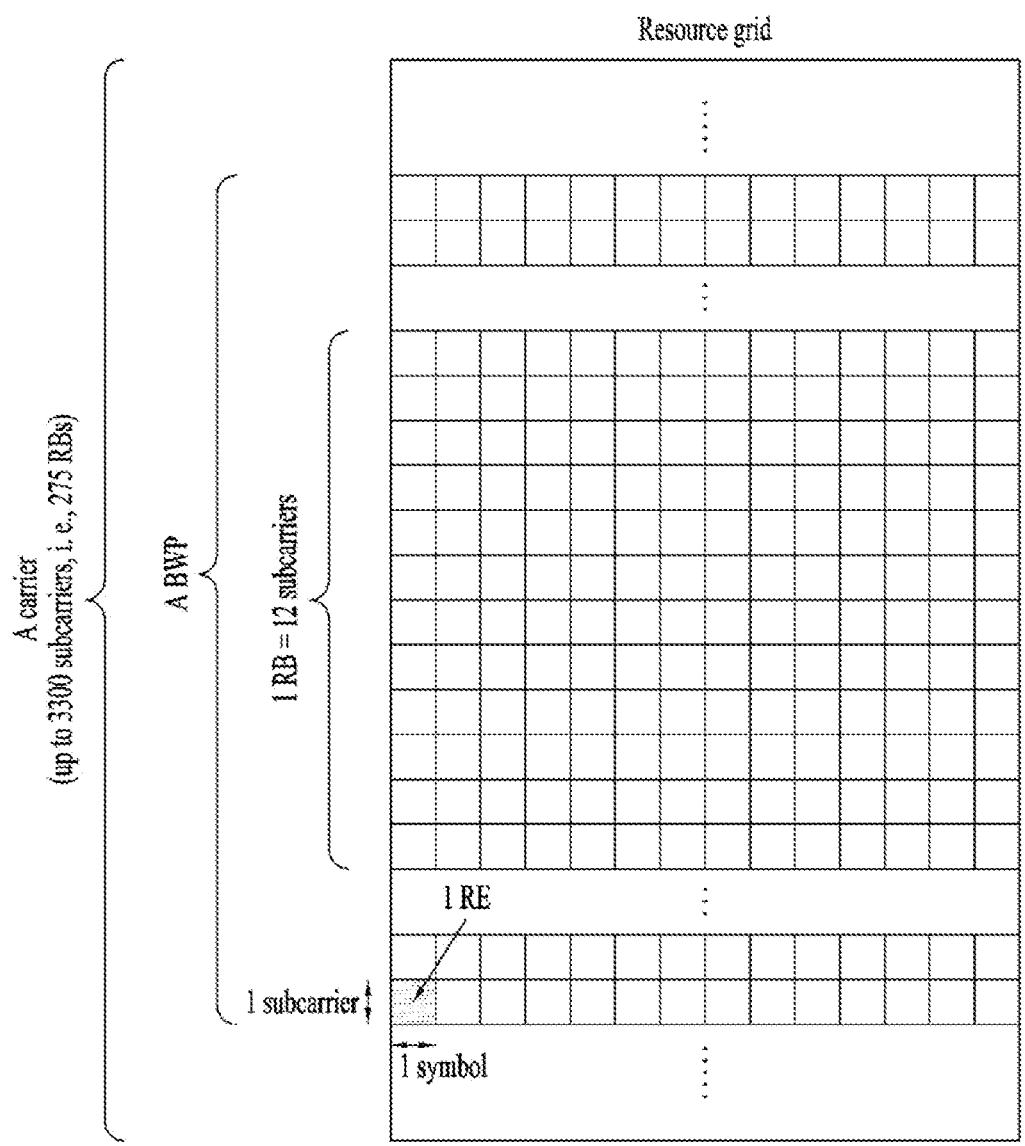
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
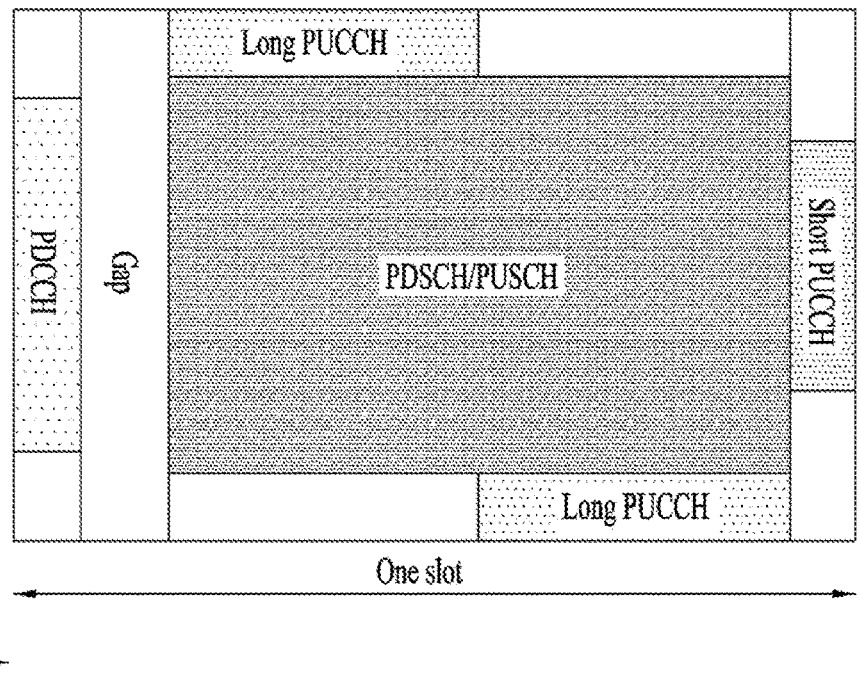
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
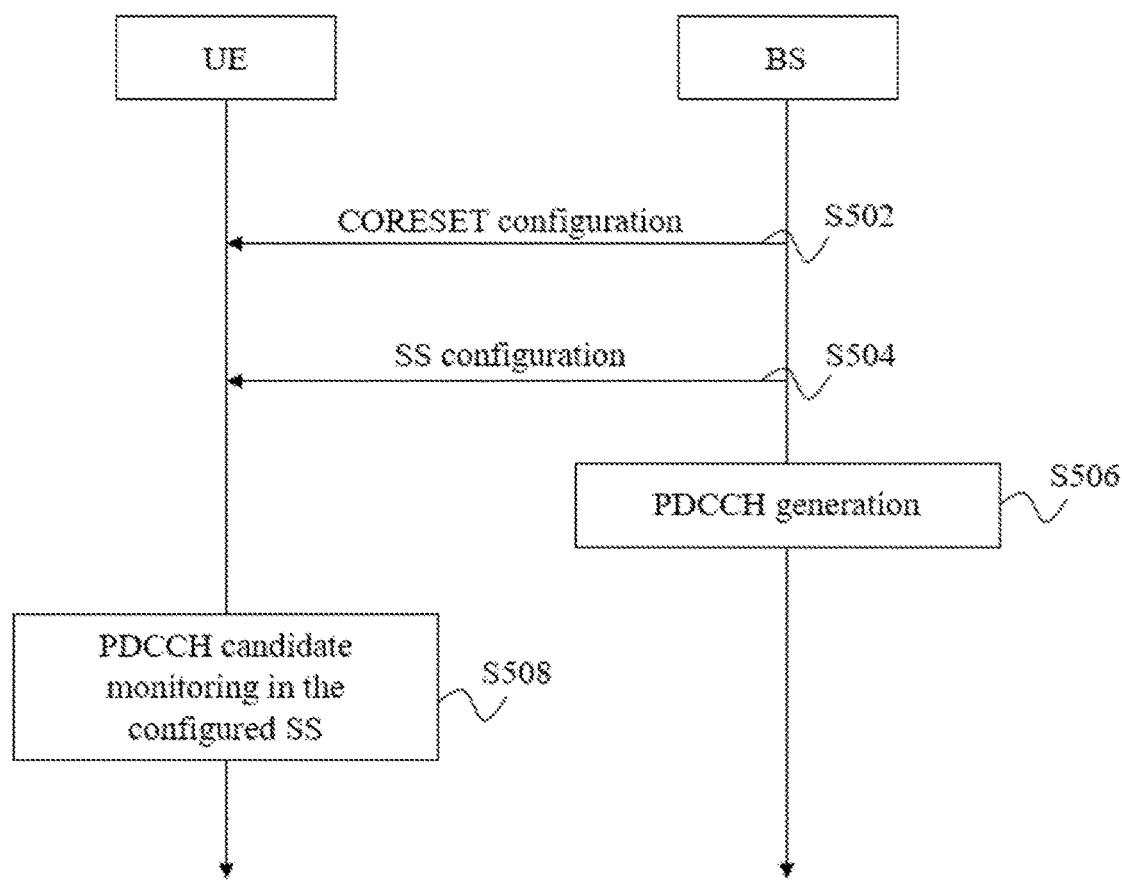
FIG. 5 is a diagram illustrating a signal flow for a physical downlink control channel (PDCCH) transmission and reception process.
Figure 6:
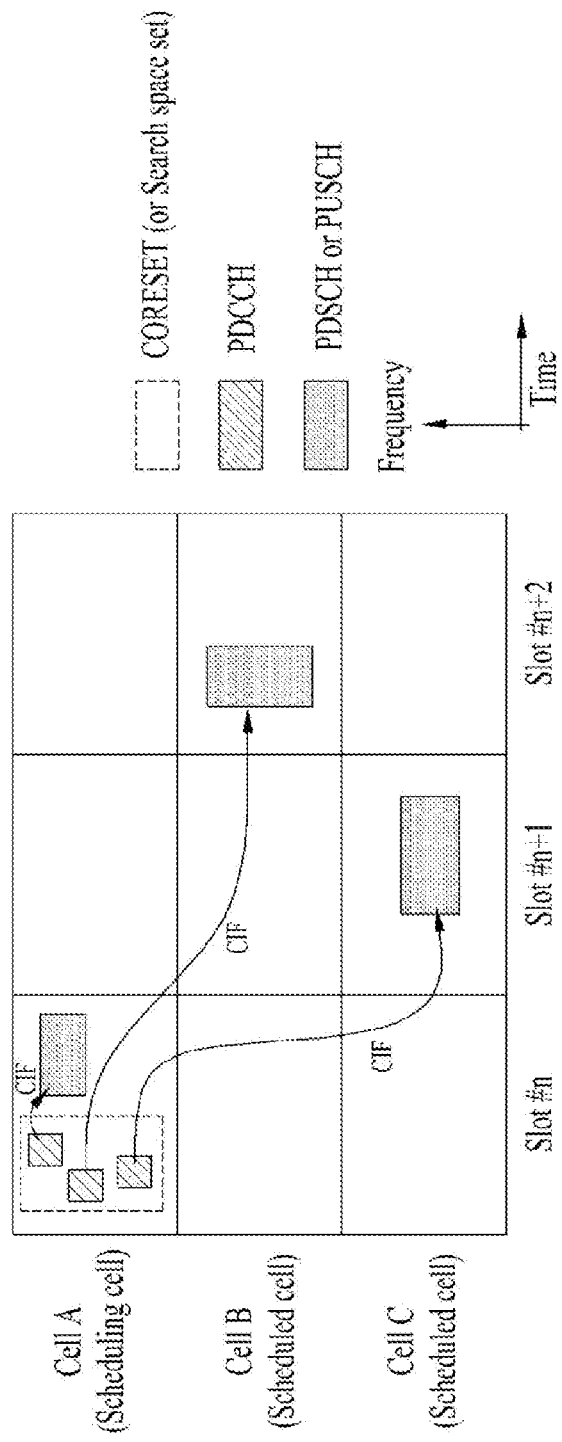
FIG. 6 illustrates a scheduling method in a multi-carrier situation.
Figure 7:
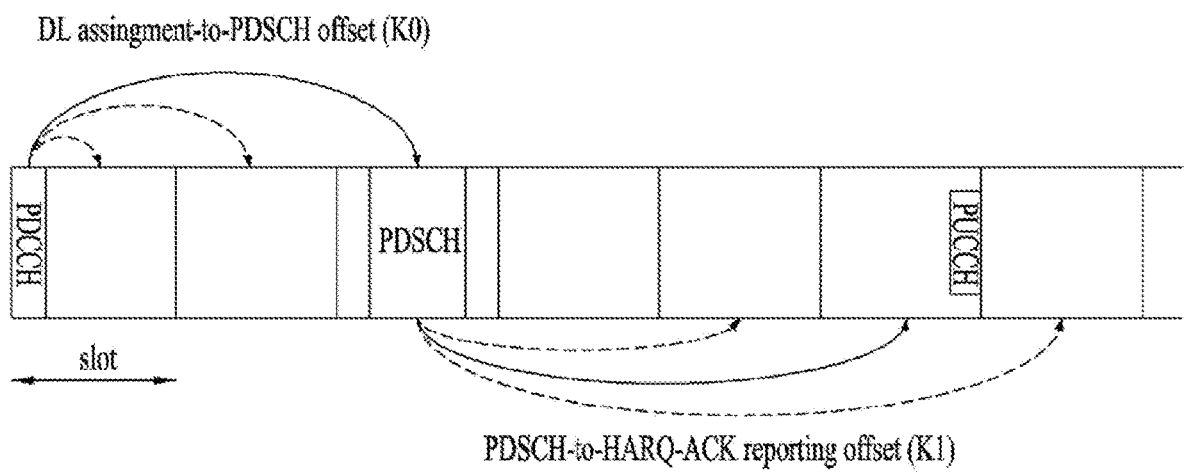
FIG. 7 illustrates an acknowledgment/negative acknowledgment (ACK/NACK) transmission process.

FIG. 5 is a diagram illustrating a signal flow for a PDCCH transmission and reception process.

Referring to FIG. 5, a BS may transmit a control resource set (CORESET) configuration to a UE (S502). A CORESET is defined as a set of resource element groups (REGs) having a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). The UE-specific RRC signaling may include, for example, an RRC setup message, BWP configuration information, and so on.
  controlResourceSetId: indicates the ID of a CORESET.
  frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
  duration: indicates the time resources of the CORESET. Duration indicates the number of consecutive OFDM symbols included in the CORESET. Duration has a value of 1 to 3.
  cce-REG-MappingType: indicates a control channel element (CCE)-REG mapping type. Interleaved and non-interleaved types are supported.
  interleaverSize: indicates an interleaver size.
  pdcch-DMRS-ScramblingID: indicates a value used for PDCCH DMRS initialization. When pdcch-DMRS-ScramblingID is not included, the physical cell ID of a serving cell is used.
  precoderGranularity: indicates a precoder granularity in the frequency domain.
  reg-BundleSize: indicates an REG bundle size.
  tci-PresentInDCI: indicates whether a transmission configuration index (TCI) field is included in DL-related DCI.
  tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.
  searchSpaceId: indicates the ID of an SS.
  controlResourceSetId: indicates a CORESET associated with the SS.
  monitoringSlotPeriodicityAndOffset: indicates a periodicity (in slots) and offset (in slots) for PDCCH monitoring.
  monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
  nrofCandidates: indicates the number of PDCCH candidates (one of values 0, 1, 2, 3, 4, 5, 6, and 8) for each AL where AL={1, 2, 4, 8, 16}.
  searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a | Paging |

TABLE 3-continued

| Type | Search Space | RNTI | Use Case |
|---|---|---|---|
| Type3-PDCCH | Common | primary cell INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | Decoding |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

NR may support a wider uplink/downlink bandwidth by aggregating multiple uplink/downlink carriers (i.e., carrier aggregation). A signal may be transmitted/received on multiple carriers by carrier aggregation. When carrier aggregation is applied, each of the carriers (refer to FIG. 3) may be referred to as a component carrier (CC). CCs may or may not be contiguous in the frequency domain. The bandwidth of each CC may be independently determined. In asymmetric carrier aggregation, the number of UL CCs may be different from the number of DL CCs. In NR, radio resources are divided into/managed as cells. A cell may consist of one DL CC and 0 to 2 UL CCs. For example, a cell may consist of (i) only one DL CC, (ii) one DC CC and one UL CC, or (ii) one DL CC and two UL CCs (including one supplementary UL CC). Cells are divided as follows. In the present disclosure, a cell may be interpreted according to a context, and may represent, for example, a serving cell. Unless otherwise stated, the operations of the present disclosure may be applied to each serving cell.

Primary Cell (PCell): A cell operating at a primary frequency (e.g., primary component carrier (PCC)) at which a UE for which carrier aggregation is configured performs an initial connection establishment procedure or initiates a connection re-establishment procedure. In the case of dual connectivity (DC), a master cell group (MCG) cell operating at a primary frequency at which the UE performs an initial connection establishment procedure or initiates a connection re-establishment procedure.

Secondary Cell (SCell): A cell that provides additional radio resources, other than a special cell for a UE for which carrier aggregation is configured.

Primary SCG Cell (PSCell): A secondary cell group (SCG) cell in which the UE performs random access when performing an RRC reconfiguration and synchronization procedure in the case of DC.

Special Cell (SpCell): In the case of DC, the SpCell represents the PCell of the MCG or the PSCell of the SCG. In the other case (i.e., the case of non-DC), the special cell represents a PCell.

Serving Cell (ServCell): Represents a cell configured for a UE in an RRC_CONNECTED state. When CA/DC is not configured, only one serving cell (i.e., PCell) exists. When CA/DC is configured, the serving cell represents a cell set including the SpCell(s) and all SCells.

The control information may be configured to be transmitted/received only through an SpCell. For example, UCI may be transmitted only through a SpCell (e.g., PCell). When an SCell in which PUCCH transmission is allowed (hereinafter, PUCCH-SCell) is configured, UCI may be transmitted even through the PUCCH-SCell. As another example, the BS may allocate a scheduling cell (set) to lower the complexity of the PDCCH blinding decoding (BD) at the UE side. For PDSCH reception/PUSCH transmission, the UE may perform PDCCH detection/decoding only in the scheduling cell. In addition, the BS may transmit the PDCCH only through the scheduling cell (set). For example, data (e.g., PDSCH, PUSCH) transmitted in one cell (or active BWP within a cell) (hereinafter, a cell may be replaced with a (active) BWP within the cell) may be scheduled through a PDCCH in the cell (Self-Carrier Scheduling (SCS)). In addition, the PDCCH for downlink allocation may be transmitted in cell #0 (i.e., a scheduling cell), and the corresponding PDSCH may be transmitted in cell #2 (i.e., a scheduled cell) (Cross-Carrier Scheduling (CCS)). The scheduling cell (set) may be configured in a UE-specific, UE-group-specific or cell-specific manner. The scheduling cell includes a special cell (e.g., PCell).

For CCS, a carrier indicator field (CIF) is used. The CIF may be disabled/enabled semi-statically by UE-specific (or UE group-specific) higher-layer signaling (e.g., RRC signaling). The CIF is an x-bit field (e.g., x=3) in the PDCCH (i.e., DCI) and may be used to indicate the (serving) cell index of the scheduled cell.

CIF disabled: The CIF is not present in the PDCCH. The PDCCH in the scheduling cell allocates PDSCH/PUSCH resources in the same cell. That is, the scheduling cell is identical to the scheduled cell.

CIF enabled: The CIF is present in the PDCCH. The PDCCH in the scheduling cell may allocate PDSCH/PUSCH resources in one of a plurality of cells using the CIF. The scheduling cell may be identical to or different from the scheduled cell. A PDSCH/PUSCH means a PDSCH or a PUSCH.

Figure 8:
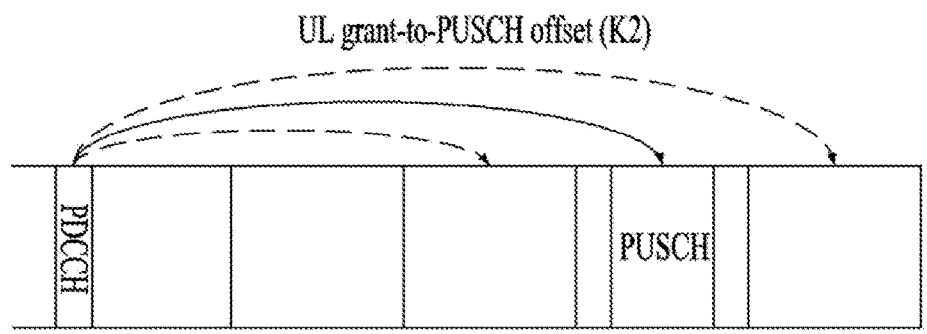
FIG. 8 illustrates a physical uplink shared channel (PUSCH) transmission process.
Figures 9, 10:
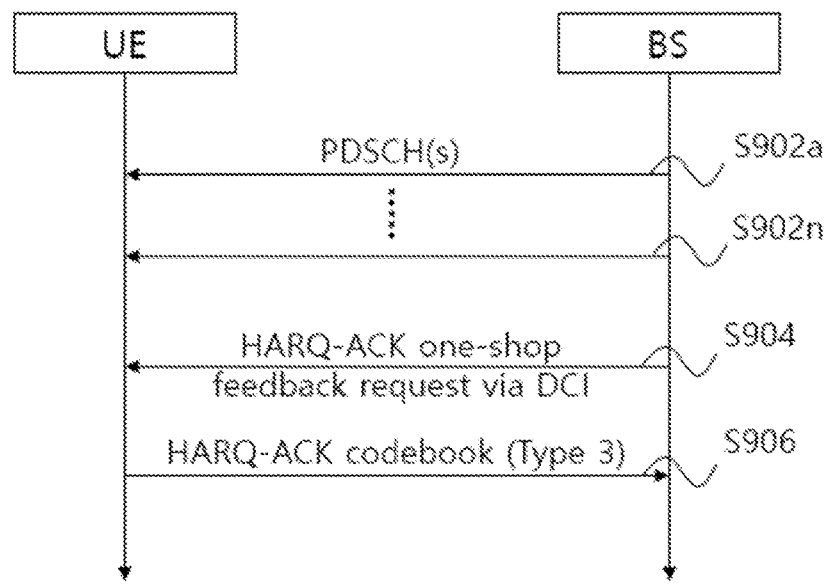
FIGS. 9 to 10 show an example of a Type 3 HARQ-ACK codebook procedure.

FIG. 9 illustrates exemplary scheduling in the case of multi-cell aggregation. Referring to FIG. 8, it is assumed that three cells are aggregated. When the CIF is disabled, only a PDCCH that schedules a PDSCH/PUSCH for each cell may be transmitted in each cell (SCS). On the other hand, when the CIF is enabled by UE-specific (or UE group-specific or cell-specific) higher-layer signaling, and cell A is configured as a scheduling cell, a PDCCH that schedules a PDSCH/PUSCH in another cell (i.e., a scheduled cell) as well as a PDCCH that schedules a PDSCH/PUSCH for cell A may be transmitted in cell A (CCS). In this case, no PDCCH that schedules a PDSCH/PUSCH for cell B/C is transmitted in cell B/C.

FIG. 10 illustrates an ACK/NACK transmission process. Referring to FIG. 10, the UE may detect a PDCCH in slot #n, where the PDCCH includes DL scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

FDRA (frequency domain resource assignment): The FDRA field indicates an RB set allocated to a PDSCH TDRA (time domain resource assignment): The TDRA field indicates K0, i.e., the starting position (e.g., OFDM symbol index) and the length (e.g., the number of OFDM symbols) of a PDSCH in a slot. The TDRA field may be indicated by a start and length indicator value (SLIV).

PDSCH-to-HARQ_feedback timing indicator: The PDSCH-to-HARQ_feedback timing indicator field indicates K1.

HARQ process number (4 bits): The HARQ process number field indicates a HARQ process identity (ID) for data (e.g., PDSCH, TB, etc.).

PUCCH resource indicator (PRI): The PRI field indicates a PUCCH resource to be used for UCI transmission among a plurality of PUCCH resources in a PUCCH resource set.

Thereafter, the UE may receive a PDSCH in slot #(n+K0) based on the scheduling information in slot #n and then transmit UCI over a PUCCH in slot #(n+K1). Here, the UCI includes a HARQ-ACK response for the PDSCH. When the PDSCH is configured to transmit a maximum of one TB, the HARQ-ACK response may be composed of one bit. When the PDSCH is configured to transmit a maximum of two TBs, the HARQ-ACK response may be composed of two bits if no spatial bundling is configured. However, if spatial bundling is configured, the HARQ-ACK response may be composed of one bit. If the HARQ-ACK transmission time for a plurality of PDSCHs is designated as slot #(n+K1), the UCI transmitted in slot #(n+K1) may include HARQ-ACK responses for the plurality of PDSCHs.

Figure 11:
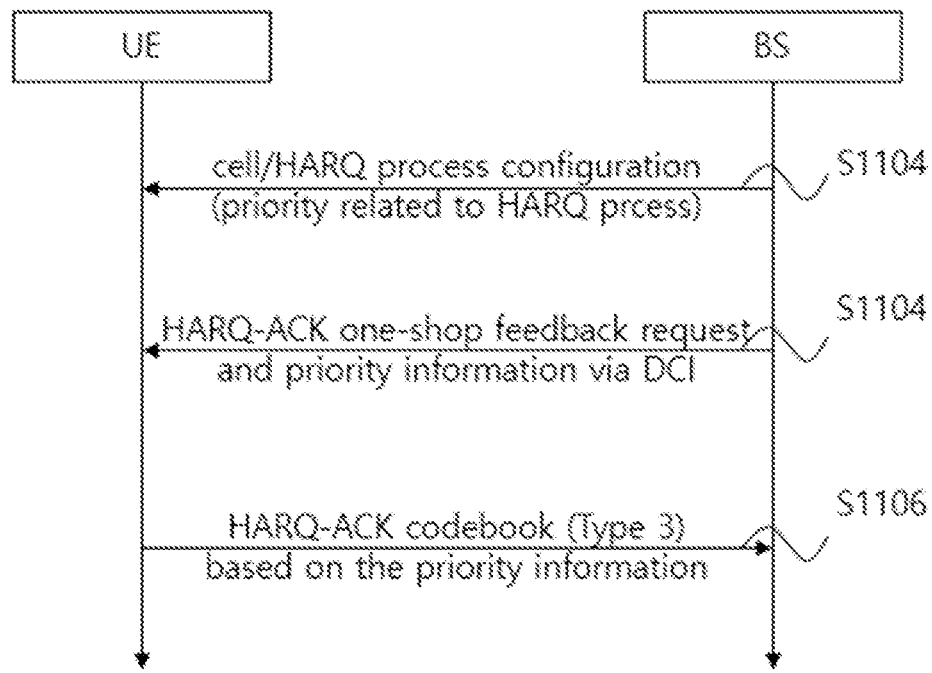

FIG. 11 illustrates a PUSCH transmission process. Referring to FIG. 11, the UE may detect a PDCCH in slot #n, where the PDCCH includes UL scheduling information (e.g., DCI formats 0_0 and 01). DCI formats 0_0 and 01 may include the following information.

FDRA: The FDRA field indicates an RB set allocated to a PUSCH.

TDRA: The TDRA field indicates a slot offset K2, i.e., the starting position (e.g., symbol index) and the length (e.g., the number of OFDM symbols) of a PUSCH in a slot. The starting symbol and length may be indicated by an SLIV or indicated separately.

Thereafter, the UE may transmit a PUSCH in slot #(n+K2) based on the scheduling information in slot #n, where the PUSCH includes a UL-SCH TB. When the PUCCH transmission time and the PUSCH transmission time overlap, UCI may be transmitted over the PUSCH (PUSCH piggyback).

Embodiment: A/N Feedback Considering Priority

FIG. 9 is a diagram showing an example of a Type-3 (one-shot) HARQ-ACK codebook transmission procedure. Here, the HARQ-ACK codebook may be used equivalently to a HARQ-ACK payload. The Type-3 HARQ-ACK codebook is introduced (in a form triggered through DCI) for HARQ-ACK feedback transmission suitable for a U (Unlicensed)-band situation, but may also be applied to an L (Licensed)-band.

Referring to FIG. 9, a UE may receive one or more PDSCHs from a BS (S902a to S902n). Thereafter, the UE may receive a HARQ-ACK one-shot feedback request from the BS through DCI (S904). Then, based on the HARQ-ACK one-shot feedback request, the UE may transmit the HARQ-ACK codebook to the BS (S906). The HARQ-ACK codebook may be transmitted through a PUCCH or a PUSCH. In the Type-3 HARQ-ACK codebook, the ACK/NACK (AN) information configured on the HARQ-ACK payload (for each of the fully configured (serving) cells) may be mapped according to a DL (PDSCH) HARQ process (hereinafter referred to as HARQ process, HARQp) index. A plurality of (e.g., 8 or 16) parallel HARQ processes may be present for each cell in the UE/BS. The plurality of parallel HARQ processes may allow DL transmissions to be performed consecutively while waiting for HARQ feedback regarding successful or unsuccessful reception of previous DL transmissions. Each HARQ process may be associated with a HARQ buffer of a medium access control (MAC) layer. Each HARQ process may manage state variables related to the number of transmissions of MAC PDUs (Physical Data Blocks) in the buffer, HARQ feedback for the MAC PDUs in the buffer, and the current redundancy version.

FIG. 10 shows a Type-3 (one-shot) HARQ-ACK codebook/payload. FIG. 10 shows a case in which two cells are configured, 16 (DL) HARQ processes are configured for cell #1, and 8 (DL) HARQ processes are configured for cell #2. Referring to FIG. 10, the HARQ-ACK payload may include AN information for all HARQ processes of all configured (serving) cells. AN information in the HARQ-ACK payload may be configured in the following order.

(1) An order of increasing cell index when there are multiple cells
(2) An order of increasing HARQp index for the same cell
(3) An order of increasing TB (Transport Block) index for HARQp index
(4) An order of increasing CBG (Codeblock Group) index for the same TB
* (3) and (4) may not be applied according to a TB/CBG configuration situation.

Recently, in order to support data transmission/services in which reliability/latency performance is important, such as URLLC, service/protection priority (e.g., LP (low priority), and HP (high priority)) for each physical layer channel/signal (or transmission resource) may be semi-statically configured (via RRC signaling, etc.) or dynamically indicated (via DCI/MAC signaling, etc.).

In addition, for all HARQ process indexes configured in a specific cell, the corresponding PDSCH transmissions and/or HARQ-ACK feedback transmission for them may be configured or indicated with an HP, and in contrast, for all HARQ process indexes configured in other cells, the corresponding PDSCH transmissions and/or HARQ-ACK feedback transmission for them may be configured/indicated only with an LP. In addition, for some of the HARQ process indexes configured in the specific cell, the corresponding PDSCH transmissions and/or HARQ-ACK feedback transmission for them may be configured or indicated with an HP, and in contrast, for the remaining HARQ process indexes, the corresponding PDSCH transmissions and/or HARQ-ACK feedback transmission for them may be configured/indicated only with an LP. The HP/LP may be configured or indicated through RRC/MAC/DCI based on HARQ process index/PDSCH and/or the corresponding HARQ-ACK feedback.

Therefore, when HARQ-ACK feedback transmission based on a Type-3 codebook is triggered through DCI, the following is proposed for a method of configuring a HARQ-ACK payload based on a service/protection priority (e.g., HP and LP). Although not limited thereto, the method of the present disclosure may be applied when HARQ-ACK feedback transmission based on the Type-3 codebook is triggered through DCI configured with an HP or indicated with an HP.

FIG. 11 shows an example of a HARQ-ACK codebook transmission procedure according to an example of the present disclosure. Referring to FIG. 11, the UE may receive cell/HARQ process configuration information from the BS (S1104). The HARQ process configuration information may be defined for each cell as a part of cell configuration information. Here, the HARQ process configuration information may include information about the number of HARQ processes and priorities (e.g., HP and LP) related to the HARQ processes. As another method, the priorities (e.g., HP and LP) related to the HARQ process within a cell may be dynamically indicated as follows through DL DCI (format) for scheduling the cell.

- If there is no priority indicator indicating an LP/HP in all DL DCI format(s) for scheduling PDSCH(s) on the cell, all HARQ processes configured in the cell in the HARQ-ACK feedback process are interpreted as being configured/indicated only with an LP.
- If there is a priority indicator indicating an LP/HP in at least one DL DCI format for scheduling a PDSCH on the cell, and the maximum number of the lowest (or highest) HARQ process indexes, which is to be indicated through all DL DCI formats with the priority indicator, is N, the lowest (or highest) HARQ process index N configured in the cell in the HARQ-ACK feedback process may be configured/indicated with an HP, while all other HARQ process indexes are interpreted as being configured/indicated only with an LP.

Then, the UE may receive a HARQ-ACK one-shot feedback request from the BS through DCI (S1104). Here, the DCI may be DCI including PDSCH scheduling or DCI including only a HARQ-ACK feedback request without PDSCH scheduling. In addition, the DCI may include priority information for an HARQ process/PDSCH requiring HARQ-ACK and/or the corresponding HARQ-ACK feedback. Then, based on the HARQ-ACK one-shot feedback request and priority information, the UE may transmit the HARQ-ACK codebook to the BS (S906). The HARQ-ACK codebook may be transmitted through a PUCCH or a PUSCH. Here, when the priority of HARQ feedback (target) is indicated with an LP based on the priority information, the HARQ-ACK codebook may be configured according to a conventional method (i.e., feedback AN for all configured cells/all HARQ processes; see FIGS. 9 to 10). When the priority of HARQ feedback (target) is indicated with an HP base on the priority information, the HARQ-ACK codebook may be configured based on the method proposed below.

[Proposed Method]

1) Opt 1

A. Only for cell(s) in which a HARQ process index with PDSCH transmission and/or the corresponding HARQ-ACK feedback transmission to be configured with an HP or indicated with an LP is present, an HARQ-ACK payload is configured in the form of mapping ACK/NACK information corresponding to all HARQ process indexes configured to the respective corresponding cell(s).

i. For example, as shown in FIG. 12, all 16 HARQ process indexes configured in cell 1 may be configured/indicated only with an LP (e.g., if there is no priority indicator indicating an LP/HP in all DL DCI format(s) for scheduling PDSCH(s) on cell 1), all 16 HARQ process indexes configured in cell 2 may be configured or indicated with an HP (e.g., if there is a priority indicator indicating an LP/HP in at least one DL DCI format for scheduling a PDSCH on cell 2 and it is possible to indicate all 16 HARQ process indexes through the corresponding DL DCI format), the lowest 8 process indexes among 16 HARQ process indexes configured in cell 3 may be configured or indicated with an HP, and in contrast, the highest 8 process indexes may be configured/indicated only with an LP (e.g., if it is possible to indicate only the lowest 8 HARQ process indexes through all DL DCI format(s) with a priority indicator indicating an LP/HP while scheduling PDSCH(s) on cell 3). In this case, if Opt 1 is applied, a HARQ-ACK payload may be configured by mapping ACK/NACK information to 16 HARQ process indexes of cell 2 and 16 HARQ process indexes of cell 3 (see FIG. 13).

2) Opt 2

A. For cell(s) in which an HARQ process index with PDSCH transmission and/or corresponding HARQ-ACK feedback transmission to be configured with an HP or indicated with an HP is present, an HARQ-ACK payload is configured by mapping ACK/NACK information only to an HARQ process index (with PDSCH transmission and/or corresponding HARQ-ACK feedback transmission) to be configured with an HP or indicated with an HP among HARQ process indexes configured to the respective corresponding cell(s).

i. When the example of FIG. 12 is applied, if Opt 2 is applied, an HARQ-ACK payload may be configured by mapping ACK/NACK information only to 16 HARQ process indices of cell 2 and the lowest 8 HARQ process indexes of cell 3 (see FIG. 14).

[Proposed Method]

When a Type-2 (dynamic) codebook type is configured for HARQ-ACK feedback, counter-DAI information, which is a PDSCH (DCI) scheduling order value for determining an ACK/NACK mapping order on the HARQ-ACK payload, may be signaled through DCI.

Figure 15:
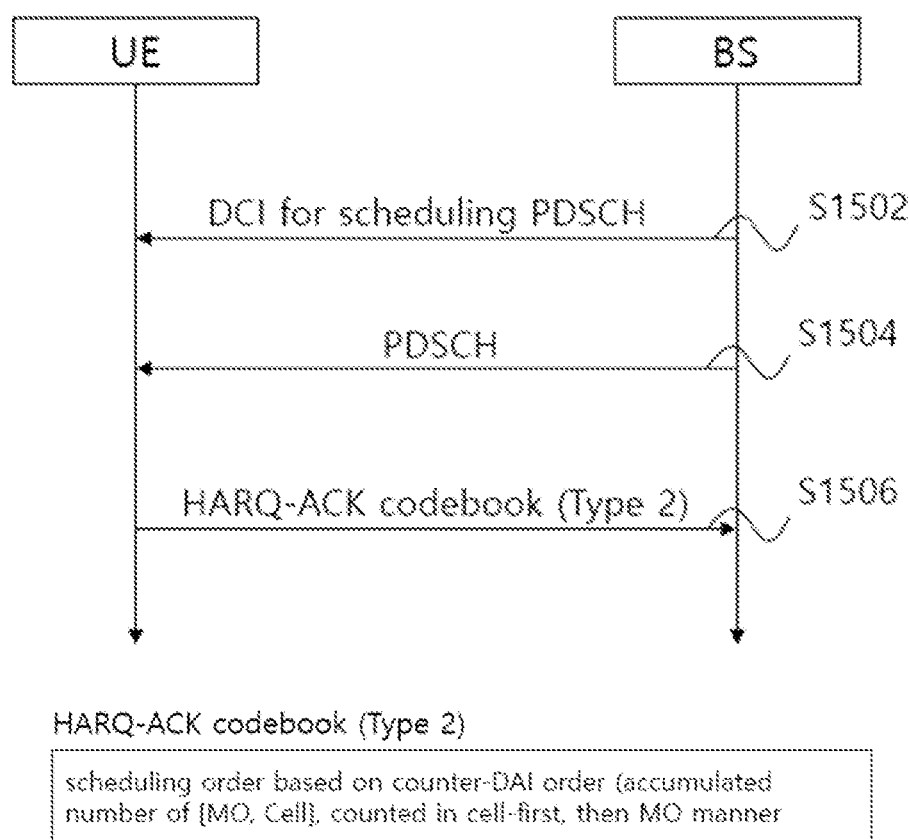

FIG. 15 shows an example of a Type-2 (dynamic) HARQ-ACK codebook transmission procedure. In the Type-2 HARQ-ACK codebook, the size of the HARQ-ACK codebook/payload may be dynamically varied based on the counter-DAI (and total-DAI) in the DCI.

Referring to FIG. 15, the UE may receive DCI (i.e., DL grant DCI) for PDSCH scheduling from the BS (S1502). Here, the DCI may include PDSCH scheduling information, information about a PUCCH transmission time, and counter-DAI. The counter-DAI may represent an order value of {MO (monitoring occasion), cell}-pair related to PDSCH/(DL) SPS-release DCI, and may be calculated in a cell first manner. MO may represent a PDCCH monitoring occasion. The DCI may further include total-DAI. The total-DAI may represent the total number of {MO, cell}-pairs associated with PDSCH/(DL_SPS-release DCI, up to the current MO in which a PDCCH is detected, and is updated in units of MOs. Then, the UE may receive a PDSCH corresponding to the DCI (S1504) and may then transmit a HARQ-ACK codebook to the BS (S1506). The HARQ-ACK codebook may be transmitted through a PUCCH or a PUSCH. An AN information location of the Type-2 HARQ-ACK codebook/payload may be determined based on the counter-DAI, and (when total-DAI is signaled), an AN payload size may be determined based on the total-DAI.

Cross-CC scheduling may be configured between cells configured with different SCSs. In particular, when a cell with a large SCS is scheduled from a cell with a small SCS, a plurality of DCIs for scheduling the same (scheduled) cell need to be supported to be transmitted/detected through one PDCCH MO(monitoring occasion) (at the same time point) for smoother and more efficient scheduling. That is, the plurality of DCIs corresponding to the same {MO, cell} pair need to be supported to be transmitted/detected. Therefore, when the Type-2 (dynamic) codebook type is configured, a rule for determining an order of counter-DAI values between DCIs corresponding to the same {MO, cell} pair may be required. In addition, there may be a need for a rule for determining an order of a counter-DAI value (between DCIs corresponding to the same {MO, cell} pair) including PDSCH-less DCI that requires HARQ-ACK feedback without PDSCH scheduling, such as DCI indicating a release operation for an SPS PDSCH and DCI indicating conversion into a dormant BWP for an SCell. To this end, the following counter-DAI order determination method is proposed.

1) Opt 1
   A. For DCI by which an earlier/advanced timing of PDSCH start symbol timing (which is lastly indicated including slot offset K0, which is DCI-to-PDSCH timing) is indicated through a Time Domain RA (TDRA) field, an earlier/advanced counter-DAI value may be configured.
     i. When the PDSCH start symbol timings indicated by a plurality of DCIs are the same, the lower the lowest PRB index in the corresponding PDSCH resource or the earlier the indicated PDSCH last symbol timing, or the lower the CORESET (pool) index through which DCI is transmitted, an earlier/advanced counter-DAI value may be configured.

2) Opt 2
   A. An earlier/advanced counter-DAI value is configured for PDSCH-less DCI than DCI involving PDSCH scheduling (PDSCH-scheduling DCI).
   B. An earlier/advanced counter-DAI value is configured for PDSCH-scheduling DCI than PDSCH-less DCI.
   C. An earlier/advanced counter-DAI value is configured for DCI indicating PDSCH start symbol timing as an earlier/advanced time point between PDSCH-scheduling DCIs (and/or between PDSCH-less DCIs).
     i. When the PDSCH start symbol timings indicated by a plurality of DCIs are the same, the lower the lowest PRB index in the corresponding PDSCH resource or the earlier the indicated PDSCH last symbol timing, or the lower the CORESET (pool) index through which DCI is transmitted, an earlier/advanced counter-DAI value may be configured.

3) Note 1
   A. In the case of PDSCH-less DCI, the corresponding PDSCH start symbol timing may be determined as the PDSCH start symbol timing virtually indicated through a TDRA field although there is no PDSCH transmission actually scheduled from the corresponding DCI.
   B. In the case of the SPS PDSCH release DCI, the corresponding PDSCH start symbol timing may be applied as the PDSCH start symbol timing indicated by the DCI that activates (at a previous time) SPS PDSCH transmission targeted for release through the corresponding DCI.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

According to the present disclosure, at least one memory (e.g., 104 or 204) may store instructions or programs which, when executed, cause at least one processor operably coupled to the at least one memory to perform operations according to various embodiments or implementations of the present disclosure.

According to the present disclosure, a computer-readable storage medium may store at least one instruction or computer program which, when executed by at least one processor, cause the at least one processor to perform operations according to various embodiments or implementations of the present disclosure.

According to the present disclosure, a computer program is stored in at least one computer readable (non-volatile) storage medium, and may include program code that, when executed, performs operations (by the at least one processor) according to some embodiments or implementations of the present disclosure. The computer program may be provided in the form of a computer program product. The computer program product may include at least one computer-readable (non-volatile) storage medium. The computer-readable storage medium may include program code that, when executed, performs operations (by the at least one processor) according to some embodiments or implementations of the present disclosure.

According to various embodiments of the present disclosure, a processing device or apparatus may include the at least one processor and at least one computer memory connected to the at least one processor. The at least one computer memory may store instructions or programs which, when executed, cause the at least one processor operably coupled to the at least one memory to perform operations according to various embodiments or implementations of the present disclosure.

A communication device according to the present disclosure may include at least one processor, and at least one computer memory operatively connected to the at least one processor, and configured to store instructions such that the at least one processor performs specific operations by executing the instructions.

Figure 16:
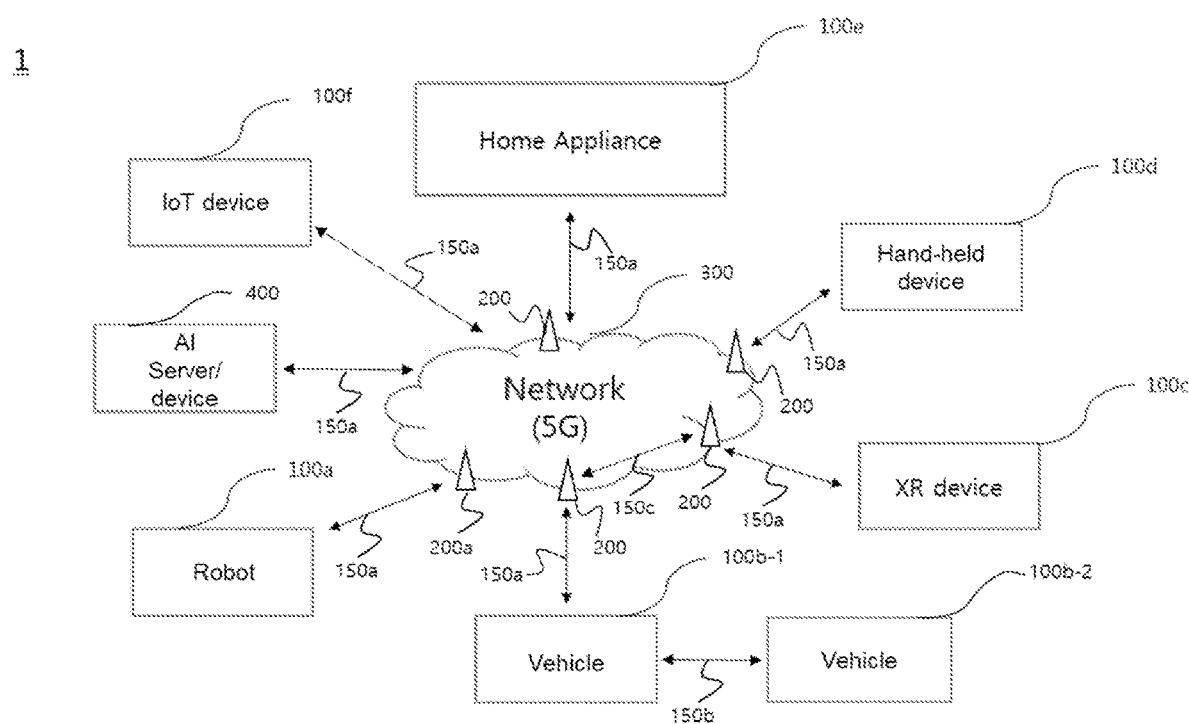
FIGS. 16 to 19 illustrate a communication system 1 and wireless devices applied to the present disclosure.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
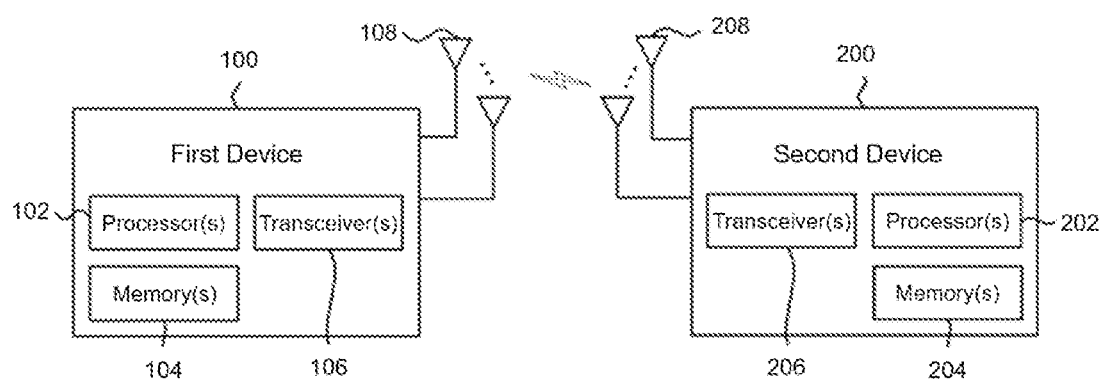

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
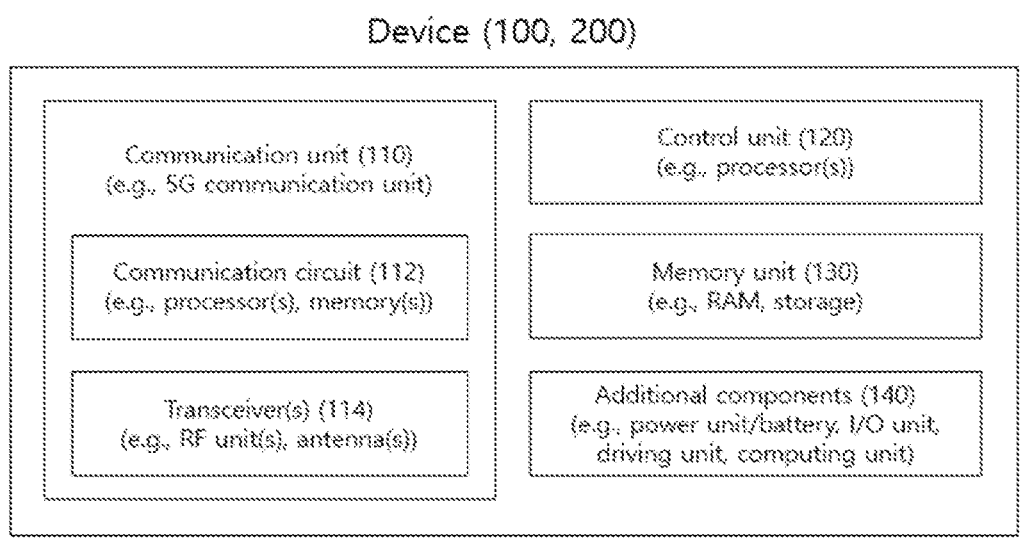

FIG. 18 illustrates another example of a wireless device applied to the present disclosure. The wireless device may be implemented in various forms according to a use-case/service (refer to FIG. 16).

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 19:
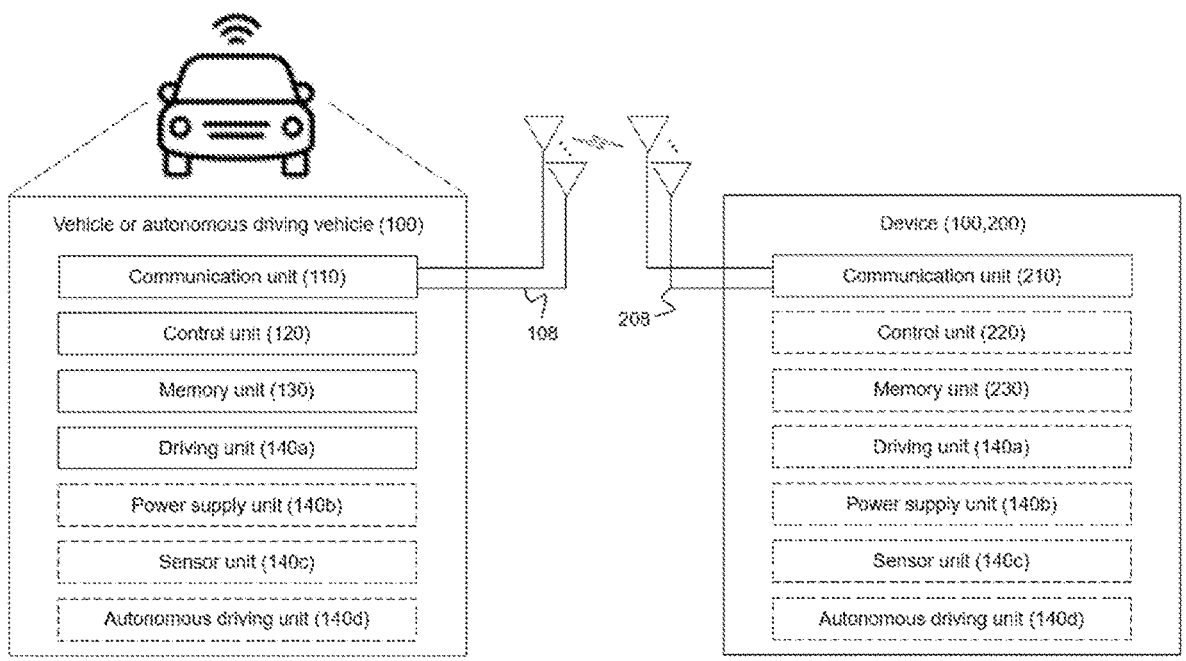

FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BS, or other devices of wireless mobile communication systems.

What is claimed is:

1. A method of transmitting control information in a wireless communication system, the method comprising:
    receiving configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present;
    receiving a HARQ Acknowledgement (HARQ-ACK) feedback request through Downlink Control Information (DCI); and
    transmitting a HARQ-ACK codebook for the plurality of cells based on the HARQ-ACK feedback request, HARQ-ACK information in the HARQ-ACK codebook being configured in an order of a cell index first and a HARQ process index,
    wherein based on the first priority being indicated by the DCI, HARQ-ACK information for the second cell is excluded from the HARQ-ACK codebook.

2. The method of claim 1, wherein, based on the second priority being indicated by the DCI, the HARQ-ACK codebook includes both HARQ-ACK information for the first cell and the second cell.

3. The method of claim 1, wherein the first cell includes both the first HARQ process index and the second HARQ process index; and
    wherein, based on the first priority being indicated by the DCI, the HARQ-ACK codebook includes only HARQ-ACK information on the first HARQ process index for the first cell.

4. The method of claim 1, wherein the first cell includes both the first HARQ process index and the second HARQ process index; and
    wherein, based on the first priority being indicated by the DCI, the HARQ-ACK codebook includes both HARQ-ACK information for the first HARQ process index and the second HARQ process index for the first cell.

5. The method of claim 1, wherein the first and second priorities are related to a priority of Physical Downlink Shared Channel (PDSCH) transmission or corresponding HARQ-ACK feedback transmission related to a HARQ process index.

6. A user equipment (UE) used in a wireless communication, the UE comprising:
    at least one radio frequency (RF) unit;
    at least one processor; and
    at least one computer memory operatively connected to the at least one processor and configured to cause the at least one processor to perform an operation when being executed, the operation comprising:
    receiving configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present;
    receiving a HARQ Acknowledgement (HARQ-ACK) feedback request through Downlink Control Information (DCI); and
    transmitting a HARQ-ACK codebook for the plurality of cells based on the HARQ-ACK feedback request, HARQ-ACK information in the HARQ-ACK codebook being configured in an order of a cell index first and a HARQ process index,
    wherein based on the first priority being indicated by the DCI, HARQ-ACK information for the second cell is excluded from the HARQ-ACK codebook.

7. The UE of claim 6, wherein, based on the second priority being indicated by the DCI, the HARQ-ACK codebook includes both HARQ-ACK information for the first cell and the second cell.

8. The UE of claim 6, wherein the first cell includes both the first HARQ process index and the second HARQ process index; and
    wherein, based on the first priority being indicated by the DCI, the HARQ-ACK codebook includes only HARQ-ACK information on the first HARQ process index for the first cell.

9. The UE of claim 6, wherein the first cell includes both the first HARQ process index and the second HARQ process index; and
    wherein, based on the first priority being indicated by the DCI, the HARQ-ACK codebook includes both HARQ-ACK information for the first HARQ process index and the second HARQ process index for the first cell.

10. The UE of claim 6, wherein the first and second priorities are related to a priority of Physical Downlink Shared Channel (PDSCH) transmission or corresponding HARQ-ACK feedback transmission related to a HARQ process index.

11. A base station (BS) used in a wireless communication system, the BS comprising:
    at least one radio frequency (RF) unit;
    at least one processor; and
    at least one computer memory operatively connected to the at least one processor and configured to cause the at least one processor to perform an operation when being executed, the operation comprising:
    transmitting configuration information regarding a plurality of cells, the plurality of cells including (i) a first cell in which a first Hybrid Automatic Repeat reQuest (HARQ) process index operable with a first priority is present and (ii) a second cell in which only a second HARQ process index operable only with a second priority lower than the first priority is present;
    transmitting a HARQ Acknowledgement (HARQ-ACK) feedback request through Downlink Control Information (DCI); and
    receiving a HARQ-ACK codebook for the plurality of cells based on the HARQ-ACK feedback request, HARQ-ACK information in the HARQ-ACK codebook being configured in an order of a cell index first and a HARQ process index with a cell index, wherein based on the first priority being indicated by the DCI, HARQ-ACK information for the second cell is excluded from the HARQ-ACK codebook.

* * * * *